United States Patent [19]
Hernandez

[11] Patent Number: 5,485,978
[45] Date of Patent: Jan. 23, 1996

[54] HUNTER'S TRIPOD STAND

[76] Inventor: Harvey Hernandez, 4646 Wales, Corpus Christi, Tex. 78413

[21] Appl. No.: 233,853

[22] Filed: Apr. 26, 1994

[51] Int. Cl.⁶ ............................................. F16M 11/24
[52] U.S. Cl. .................... 248/165; 248/188.7; 182/151
[58] Field of Search ............................ 248/165, 188.7, 248/168, 170; 182/116, 127, 133, 151, 187; 297/16.2, 344.21

[56] References Cited

U.S. PATENT DOCUMENTS

| | | |
|---|---|---|
| 693,685 | 2/1902 | Case . |
| 3,220,766 | 11/1965 | Kates ..................................... 297/184 |
| 3,313,505 | 4/1967 | Petrie ..................................... 248/165 |
| 3,441,310 | 4/1969 | Gale ....................................... 297/294 |
| 3,472,339 | 10/1969 | Herrera ................................... 182/116 |
| 3,667,773 | 6/1972 | Hess ........................................ 280/30 |
| 4,045,040 | 8/1977 | Fails ........................................ 280/1.5 |
| 4,266,748 | 5/1981 | Dalton .................................... 248/425 |
| 4,412,398 | 11/1983 | Harmon ....................................... 43/1 |
| 4,674,598 | 6/1987 | Sides et al. ............................. 182/116 |
| 5,009,283 | 4/1991 | Prejean ................................... 182/187 |
| 5,195,611 | 3/1993 | Untz ....................................... 182/187 |

FOREIGN PATENT DOCUMENTS 1262209  4/1961  France .

Primary Examiner—Leslie A. Braun
Assistant Examiner—Anita King
Attorney, Agent, or Firm—Richard C. Litman

[57] ABSTRACT

The instant invention provides a support or stand that provides a hunter or observer with an elevated vantage point for observing a large area of terrain. The elevated stand may include a rotatable body supporting member or chair rotatably connected to a support base. The rotatable chair may include a seat and a back rest substantially perpendicular to the seat. The rotatable chair may include a threaded fastener for rotatably securing the chair to the support base. The support base may include a base platform and a plurality of legs. A first leg may have a plurality of rungs spaced along the leg for climbing the support base. Each leg may include a foot rest segment that combines to substantially define a ring or circle of about 360°. The support base may be configured as a hunter's tripod stand having one permanently attached leg and two detachable legs. Each of the legs may also include an L-shaped anchor element for securing each respective leg to the ground or like supporting surface. Each of a pair of sleeves connected to the base platform of the support base may receive and frictionally secure a detachable leg by use of a threaded fastener. The permanently attached leg may include a pair of storage rods for securing the detachable legs to the permanently attached leg, when the elevated stand is in a storage configuration.

18 Claims, 3 Drawing Sheets

HUNTER'S TRIPOD STAND

BACKGROUND OF THE INVENTION

1. Field of the Invention

The present invention relates to an observation stand for elevating an observer above ground level, and more particularly, to a portable hunter's tripod stand for elevating a hunter above ground so the hunter has an unobstructed view of a large area of terrain.

2. Description of the Prior Art

Many elevated supports for hunters have been proposed, so a hunter may have an unobstructed view of a large area of terrain. However, the prior art elevated stands suffer from a number of drawbacks. Some elevated stands have many complex parts that may only be assembled with the use of tools, while other elevated stands have stationary chairs or seats so the hunter or observer cannot rotate a chair or seat through a range of 360°.

U.S. Pat. No. 3,220,766 issued to Robert Kates on Nov. 30, 1965 describes a portable hunter's blind stand having a circular platform 10 and four legs 13, wherein each leg terminates in a disk 14 and spike 15. A removable seat 20 having a back rest 21 is located on the circular platform.

U.S. Pat. No. 3,472,339 issued to C. Herrera C. on Oct. 14, 1969 describes a device for supporting a fisherman over a body of water. The device may include three legs 14, 16, 30 that support a seat 12 having a hingedly connected top wall 46.

U.S. Pat. No. 3,667,773 issued to Donald Hess on Jun. 6, 1972 describes surveyor field tripod having a seat 13 and anchoring stakes 34, 36, 38. U.S. Pat. No. 4,045,040 issued to Hershell Fails on Aug. 30, 1977 describes a deer stand and game carrier having a ladder frame and a seat 7a having a hinged back 8. U.S. Pat. No. 4,412,398 issued to Alvin Harmon on Nov. 1, 1983 describes a hunting stand having a rotatable seat 41 located on a platform 21.

U.S. Pat. No. 4,674,598 issued to Harold Sides on Jun. 23, 1987 describes a single pole hunting stand supported by three guy wires. U.S. Pat. No. 5,195,611 issued to Reese Untz on Mar. 23, 1993 describes a portable observation and hunting stand having a ladder-like frame, a seat and a wheel for facilitating movement of the stand.

U.S. Pat. No. 693,685 issued to George Case on Feb. 18, 1902 describes a back for stools. U.S. Pat. No. 3,441,310 issued to John Gale on Apr. 29, 1969 describes a seating structure. French Patent No. 1,262.209 issued to Laurent Host on Apr. 17, 1961 describes an elevated seating structure.

None of the above inventions and patents, taken either singly or in combination, is seen to describe the instant invention as claimed.

SUMMARY OF THE INVENTION

The present invention provides an elevated support or hunter's tripod stand that is inexpensive to manufacture and maintain.

Accordingly, it is a principal object of the invention to provide a hunter's tripod stand with few parts and is durable and easy to use.

It is another object of the invention to provide a hunter's tripod stand having simple components, such as sliding detachable legs and threaded fasteners, so the hunter's tripod stand may be assembled or disassembled without requiring the use of tools.

It is an object of the invention to provide improved elements and arrangements thereof in an apparatus for the purposes described which is inexpensive, dependable and fully effective in accomplishing its intended purposes.

The instant invention provides a support or stand that provides a hunter or observer with an elevated vantage point for observing a large area of terrain. The elevated stand may include a rotatable body supporting member or chair rotatably connected to a support base. The rotatable chair may include a seat and a back rest substantially perpendicular to the seat. The rotatable chair may include a threaded fastener for rotatably securing the chair to the support base.

The support base may include a base platform and a plurality of legs. A first leg may have a plurality of rungs spaced along the leg for climbing the support base. Each leg may include a foot rest segment that combine to substantially define a ring or circle of about 360°.

The support base may be configured as a hunter's tripod stand having one permanently attached leg and two detachable legs. Each leg may also include an L-shaped anchor element for securing a respective leg to the ground or like supporting surface.

A pair of sleeves may be connected to the base platform of the support base for receiving and frictionally securing each detachable leg to the base platform by use of a threaded fastener. The permanently attached leg may include a pair of storage rods for securing the detachable legs to the permanently attached leg, when the elevated stand is in a storage configuration.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The instant invention provides a support or stand that provides a hunter or observer with an elevated vantage point for observing a large area of terrain. The stand may be configured as a hunter's tripod stand. It is advantageous for a hunter to use an elevated stand, as the hunter may observe a larger area of terrain with fewer obstructions than a hunter on the ground.

Figure 1:
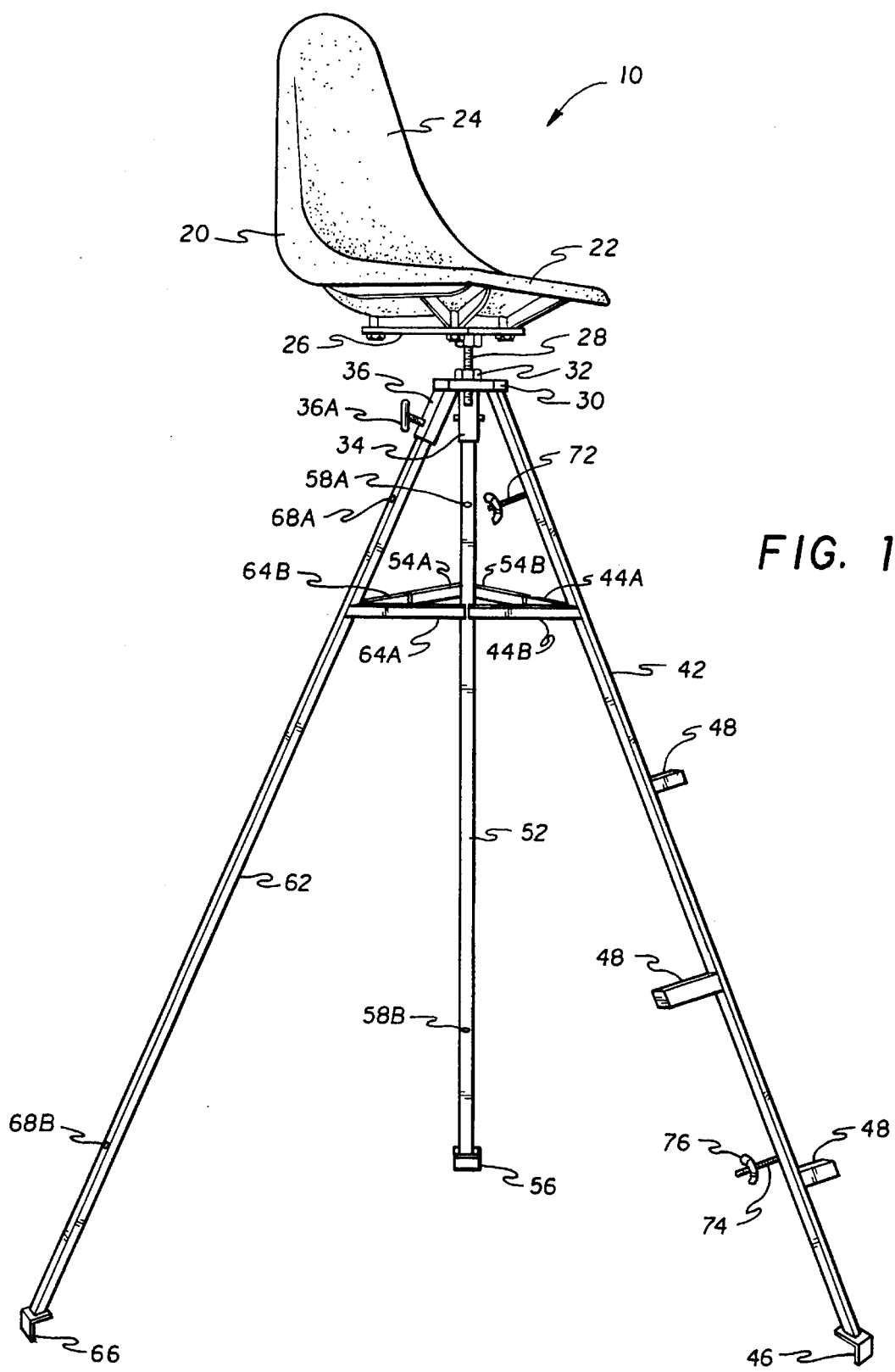
FIG. 1 is a perspective view of a hunter's tripod stand, in an extended or open position, according to the invention.
Figure 2:
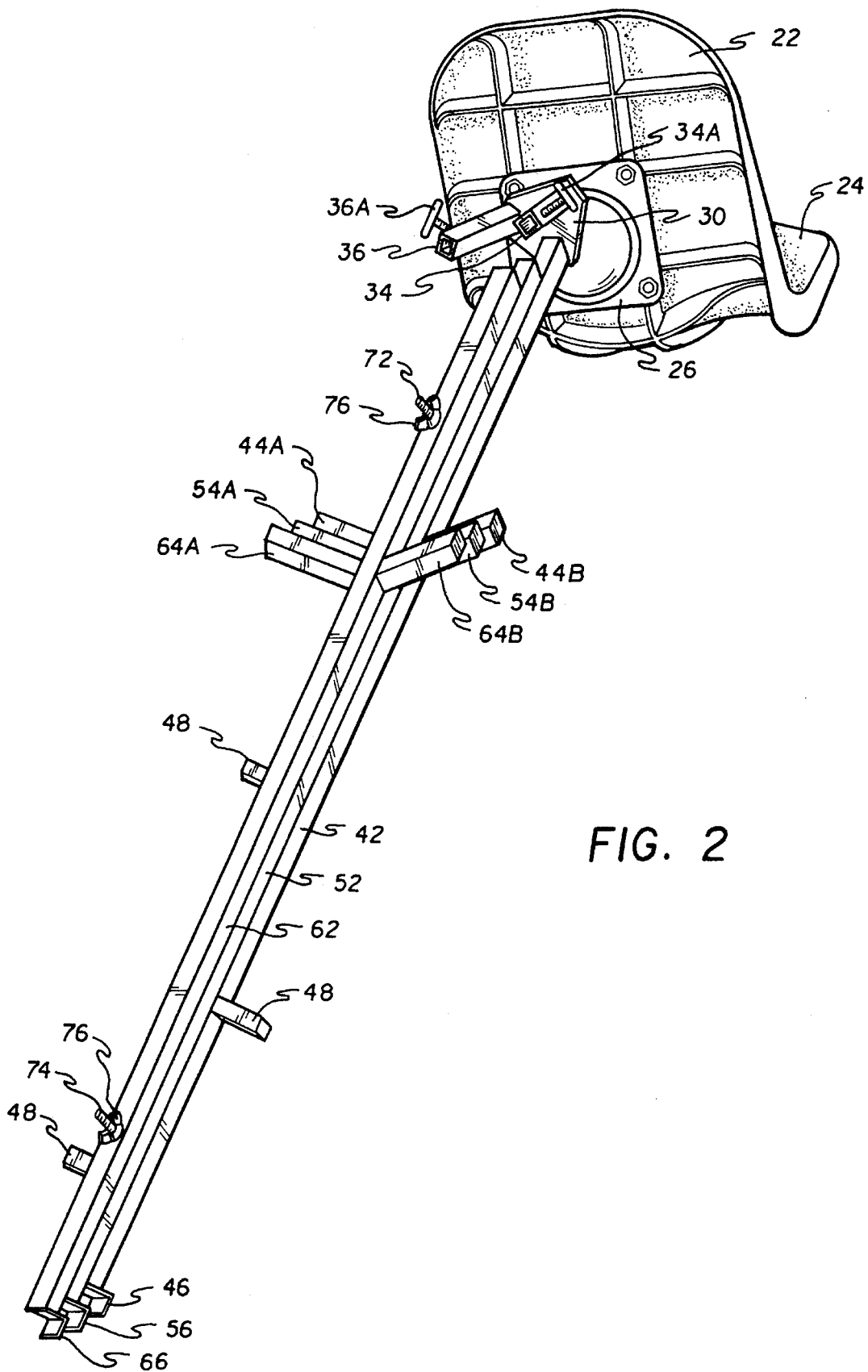
FIG. 2 is a perspective view of the hunter's tripod stand, in a compact or closed position, of FIG. 1.
Figure 3:
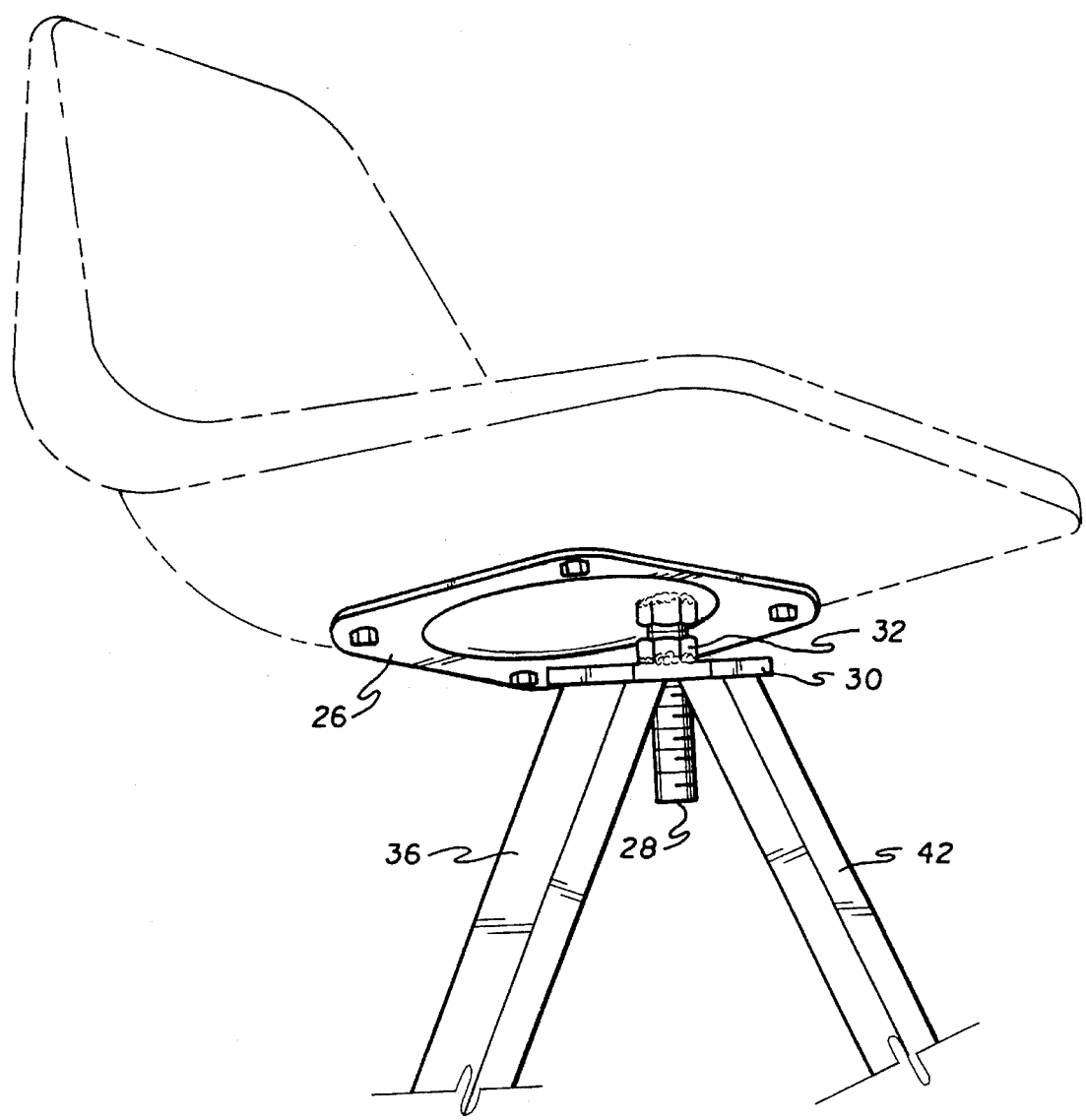
FIG. 3 is an enlarged side view in elevation of the hunter's chair platform of FIG. 1.

According to the instant invention simplified components are used that substantially assemble and disassemble the hunter's tripod stand without the use of tools. As shown in FIGS. 1–3, a hunter's tripod stand 10 may include a rotatable body supporting member or chair 20 rotatably connected to a support base. The rotatable chair may include a seat 22 and a backrest 24 substantially perpendicular to the seat. According to the preferred embodiment, the chair is formed from lightweight molded plastic and may have a plurality of strengthening ribs.

The rotatable chair may include a chair platform 26 having a threaded fastener or chair bolt 28 attached thereto by welding for rotatably securing the chair to the support base. The support base may include a base platform 30 and a plurality of legs 42, 52, 62. Each of the legs may include a foot rest segment that combines to substantially define a ring or circle of about 360°.

According to the preferred embodiment, the legs are formed from hollow, square steel tubing to maximize the strength of the structure without excessively increasing the weight of the structure. According to the preferred embodiment, the hollow, square tubing may have a 1" nominal width and a 1/16" wall thickness.

First leg 42 may have a plurality of rungs or foot steps 48 spaced along the leg for climbing the support base. The first leg may also exhibit foot rests 44a, 44b that may be welded or otherwise attached to the first leg. According to the preferred embodiment, anchor element 46 is configured as a downwardly directed L-shaped bracket. A vertical portion of the bracket functions as a spike or ground piercing element, and a horizontally directed portion of the bracket functions as weight distributing element that is wider than the leg and advantageously supports the device when the stand is located on soft or wet earth.

The support base may be configured as a hunter's tripod stand having one permanently attached leg 42 and two detachable legs 52, 62. According to the preferred embodiment, legs 52, 62 may also include an L-shaped anchor element 56, 66, respectively, for securing a respective leg to the ground or like supporting surface, as described above with regard to the first leg.

A pair of sleeves 34, 36 may be connected to the base platform 3 of the support base for receiving and frictionally securing each detachable leg to the base platform by use of a respective threaded fastener 34a, 36a. According to the preferred embodiment, each sleeve is configured as a square steel tubing with a 1¼" nominal width and a 1/16" wall thickness.

Second leg sleeve 34 may be configured as a hollow tube having an aperture (not shown) disposed in the side of the hollow tube. A threaded nut (not shown) may be welded over the aperture, so a hole in the threaded nut is co-extensive with the aperture in the sleeve. In this manner a T-shaped threaded fastener 34a may be threaded into the threaded nut and contact second leg 52. Alternatively, a threaded aperture (not shown) may be located in the sleeve to directly accept the threaded fastener.

The permanently attached first leg 42 may include a pair of threaded elements or storage rods 72, 74 for securing the detachable legs to the permanently attached leg, when the elevated stand is in a storage configuration. Upper storage rod 72 and lower storage rod 74 may include a wing nut or storage rod fastener 76.

The chair 20 may be rotatably secured to the support base by a threaded connection. A chair bolt 28 may be threaded into a platform nut 32 that is welded or otherwise connected to platform 30 and aligned with an aperture (not shown) in platform 30.

As shown in FIG. 2, the hunter's tripod stand may be broken down and configured in a storage or transport position. Detachable legs 52, 62 are located above permanently attached leg 42, so foot rests 54a, 54b of second leg 52 and foot rests 64a, 64b of third leg 62 are substantially parallel and aligned with foot rests 44a, 44b of first leg 42.

As shown in FIG. 1, second leg 52 includes an upper aperture 58a and a lower aperture 58b that are sized to accept upper storage rod 72 and lower storage rod 74, respectively. Third leg 62 includes an upper aperture 68a and a lower aperture 68b that are sized to accept upper storage rod 72 and lower storage rod 74, respectively. The distances between the apertures in the second leg and the third leg, respectively, are substantially the same as the distance between the storage rods.

According to the preferred embodiment, the distance from an end of the second leg to the upper aperture may be staggered a predetermined distance from the distance from an end of the first leg to the upper storage rod. Likewise, the distance from an end of the third leg to the upper aperture may be staggered a predetermined distance from the distance from an end of the second leg to the upper aperture. This staggered arrangement advantageously provides a clearance of varying distances between platform 30 and the ends of detachable legs 52, 62.

According to the preferred embodiment, the hunter's tripod may be sized as a 4', 5', 6', 7' or 8' stand and may weigh 20–40 lbs. The height of the stand is defined as the distance from the ground or supporting surface to platform 30. For example, each leg of the 4' stand will be slightly greater than four feet in length in view of the angular orientation of each leg.

The plastic chair may weigh approximately 4–5 lbs and the support base may weigh approximately 16–35 lbs. A steel ¾" to 1" chair bolt having a coarse thread may be welded to a ¼" steel chair base. A ¾" to 1" platform nut 32 having a complementary coarse thread may be welded to a ¼" steel platform 30. The use of a nut and bolt arrangement to rotatably connect the chair to the support base results in a noiseless or substantially noiseless operation of the device.

Many prior art stands use a bearing connection between the chair and support base. A bearing connection is disadvantageous as the rotation of the individual balls or tapered bearings frequently result in noise or sound that is perceptible to the animals or game being hunted. In contrast, the simple, threaded connection of the instant invention provides a noiseless or substantially noiseless connection, which does not audibly alert the game to the hunter's location.

It is contemplated that the 4' embodiment of the hunter's tripod stand may have one or two rungs 48 and the legs may form an angle of from about 62° to about 64° with the horizontal plane defined by platform 30. In other words, the legs may form an angle from about 26° to about 28° with respect to a vertical axis perpendicular to platform 30.

The 5' embodiment of the hunter's tripod stand may have two or three rungs 48 and the legs may form an angle of from about 64° to about 66° with the horizontal plane defined by platform 30. In essence, the legs in conjunction with a vertical axis perpendicular to platform 30 may form an angle from about 24° to about 26°.

The 6' embodiment of the hunter's tripod stand may have three or four rungs 48 and the legs may form an angle of about 66° to about 68° with the horizontal plane defined by platform 30. The legs may define an angle from about 22° to about 24° with a vertical axis perpendicular to platform 30.

The 7' embodiment of the hunter's tripod stand may have three or four rungs 48 and the legs may form an angle of from about 68° to about 70° with the horizontal plane defined by platform 30. In other words, the legs and a vertical axis perpendicular to platform 30 may define an angle from about 20° to about 22°.

The 8' embodiment of the hunter's tripod stand may have four rungs 48 and the legs may form an angle of from about 70° to about 72° with the horizontal plane defined by platform 30. The legs and a vertical axis perpendicular to platform 30 may define an angle from about 18° to about 20°. Of course, the angle defined by the legs and the number of rungs may be varied to fit the preferences of the user. The above described number of rungs and angular orientations are in accordance with the preferred embodiments of the invention.

It is also contemplated to use aluminum or another high strength low weight material for the support base. With aluminum, an alternative bracing mechanism such as steel rods along the length of each leg may be used to strengthen the support base.

It is to be understood that the present invention is not limited to the preferred embodiments described above, but encompasses any and all embodiments within the scope of the following claims.

I claim:

1. An elevated stand configured for storage or transport comprising:

a rotatable body supporting member;

a support base connected to said rotatable body supporting member, said support base including a base platform and a plurality of legs comprising a first leg and a second leg;

said first leg there to includes at least one storage rod for securing said second leg, a plurality of rungs spaced along a portion of said first leg and a foot rest segment located above said rungs, and said second leg being a detachable leg and further including a foot rest segment, whereby said second leg can be attached to said first leg in a storage or transport configuration.

2. The elevated stand according to claim 1, wherein said rotatable body supporting member further comprises a seat and a backrest substantially perpendicular to said seat.

3. The elevated stand according to claim 1, wherein said legs of said support base further comprise a third leg including a foot rest segment.

4. The elevated stand according to claim 1, wherein each leg further includes an anchor element for securing said legs to a supporting surface.

5. The elevated stand according to claim 4, wherein said anchor element defines a downwardly directed L-shaped anchor element.

6. The elevated stand according to claim 1, wherein said base platform of said support base further includes a sleeve configured to receive said second detachable leg.

7. The elevated stand according to claim 6, wherein said sleeve of said support base further comprises a fastener for frictionally securing said second detachable leg to said sleeve.

8. The elevated stand according to claim 1, wherein said rotatable body supporting member further comprises a seat and a threaded fastener for rotatably securing said seat to said support base.

9. The elevated stand according to claim 1, wherein said first leg includes an upper storage rod and a lower storage rod.

10. The elevated stand according to claim 1, wherein said plurality of rungs on said first leg are spaced alternately on opposite sides of said first leg.

11. A hunter's tripod stand configured for storage or transport comprising:

a rotatable body supporting member;

a support base connected to said rotatable body supporting member, said support base including:

a base platform attached to a plurality of legs consisting of a non-detachable first leg, a detachable second leg and a detachable third leg;

the non-detachable first leg includes at least one storage rod for securing said detachable second and third legs and a plurality of rungs spaced along a portion of said first leg and foot rest segments located above said rungs;

the second detachable leg including foot rest segments;

and the third detachable leg including foot rest segments; and wherein said foot rest segments on each leg are substantially parallel to each other and align with another segment of another leg; and whereby said second and third legs can be attached to said first leg in a storage or transport configuration.

12. The hunter's tripod stand according to claim 11, wherein said rotatable body supporting member further comprises a seat and a back rest substantially perpendicular to said seat.

13. The hunter's tripod stand according to claim 12, wherein each of said legs further comprises an anchor element for securing one of said legs to a supporting surface.

14. The hunter's tripod stand according to claim 13, wherein said an anchor element defines and L-shaped anchor element.

15. The hunter's tripod elevated stand according to claim 14, wherein said base platform of said support base further comprises a pair of sleeves, each of said sleeves configured to receive one of said detachable legs.

16. The hunter's tripod stand according to claim 15, wherein at least one of said sleeves of said support base further comprises a fastener for frictionally securing one of said detachable legs to said sleeve.

17. The hunter's tripod stand according to claim 11, wherein said plurality of rungs on said first leg are spaced alternately on opposite sides of said first leg.

18. The hunter's tripod stand according to claim 11, wherein said first non-detachable leg includes an upper storage rod and a lower storage rod.

\* \* \* \* \*